(12) United States Patent
Miranda et al.

(10) Patent No.: US 10,333,987 B2
(45) Date of Patent: Jun. 25, 2019

(54) SECURITY ENHANCEMENT TOOL FOR A TARGET COMPUTER SYSTEM OPERATING WITHIN A COMPLEX WEB OF INTERCONNECTED SYSTEMS

(71) Applicant: Bank of America Corporation, Charlotte, NC (US)

(72) Inventors: Hector D. Miranda, West Windsor, NJ (US); Gary Wayne Richardson, Dallas, TX (US); Michael Aaron Schetgen, Charlotte, NC (US); Soaham D. Joshi, West Chicago, IL (US); Todd M. Goodyear, New Hope, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/599,442

(22) Filed: May 18, 2017

(65) Prior Publication Data

US 2018/0337949 A1    Nov. 22, 2018

(51) Int. Cl.
| | |
|---|---|
| *H04L 29/06* | (2006.01) |
| *G06F 8/65* | (2018.01) |
| *G06Q 10/10* | (2012.01) |
| *G06F 21/57* | (2013.01) |

(52) U.S. Cl.
CPC ............. *H04L 63/20* (2013.01); *G06F 8/65* (2013.01); *G06F 21/57* (2013.01); *G06Q 10/1097* (2013.01)

(58) Field of Classification Search
CPC ........ H04L 63/20; G06Q 10/1097; G06F 8/65
See application file for complete search history.

(56) References Cited

U.S. PATENT DOCUMENTS

| | | | | |
|---|---|---|---|---|
| 5,537,858 | A | * | 7/1996 | Bauer .................. H01H 33/668 218/122 |
| 6,813,526 | B1 | * | 11/2004 | Dodd, Jr. ........... G05B 19/0423 700/65 |
| 7,185,047 | B1 | * | 2/2007 | Bate ........................ H04L 63/08 709/202 |
| 7,433,892 | B2 | | 10/2008 | Bivens, II et al. |
| 7,484,242 | B2 | | 1/2009 | Aggarwal et al. |
| 8,046,767 | B2 | | 10/2011 | Rolia et al. |

(Continued)

OTHER PUBLICATIONS

Zhou et al., Always Up-to-date—Scalable Offline Patching of VM Images in a Compute Cloud, ACM, Dec. 2010.*

(Continued)

*Primary Examiner* — David Garcia Cervetti
(74) *Attorney, Agent, or Firm* — Weiss & Arons LLP; Michael A. Springs, Esq.

(57) ABSTRACT

Systems and methods the improve operation and security of large complex webs of 200,000 to 2,000,000 interconnected systems are provided. Systems and methods may dynamically schedule downtime for target systems within the complex. The schedule downtime may not impact operations stability of the complex web. Based on computational resource constraints, systems and methods may provide dynamic rescheduling of system downtime. Systems and methods may provide dynamic computational capacity management by adding capacity and/or reorganizing systems within the complex web.

20 Claims, 8 Drawing Sheets

(56) References Cited

U.S. PATENT DOCUMENTS

| | | | |
|---|---|---|---|
| 8,972,963 B2* | 3/2015 | Baset | G06F 8/68 717/168 |
| 9,201,695 B2 | 12/2015 | Watanabe et al. | |
| 9,380,068 B2 | 6/2016 | Iyer et al. | |
| 9,384,028 B1* | 7/2016 | Felstaine | H04L 67/02 |
| 9,430,217 B2* | 8/2016 | Chen | G06F 9/44536 |
| 9,639,103 B2* | 5/2017 | Darden, II | H02J 13/0013 |
| 9,712,388 B2* | 7/2017 | Mishra | H04L 41/0853 |
| 9,722,858 B2* | 8/2017 | Markley | H04L 67/34 |
| 9,736,013 B2* | 8/2017 | Markley | H04L 67/34 |
| 9,742,873 B2* | 8/2017 | Ananthanarayanan | G06F 9/5072 |
| 9,760,428 B1* | 9/2017 | Felstaine | H04L 41/022 |
| 9,842,042 B2* | 12/2017 | Chhatwal | G06F 11/3664 |
| 9,866,161 B1* | 1/2018 | Johnson | G05B 13/0265 |
| 9,880,580 B2* | 1/2018 | Darden, II | G06Q 50/06 |
| 2004/0039728 A1* | 2/2004 | Fenlon | H04L 41/0681 |
| 2004/0114516 A1* | 6/2004 | Iwata | H04L 12/5602 370/230.1 |
| 2005/0015477 A1* | 1/2005 | Chen | H04L 41/06 709/223 |
| 2005/0144022 A1* | 6/2005 | Evans | G06Q 10/06 705/7.42 |
| 2006/0101457 A1* | 5/2006 | Zweifel | G06F 8/65 717/174 |
| 2006/0136720 A1* | 6/2006 | Armstrong | G06F 21/53 713/164 |
| 2007/0214033 A1* | 9/2007 | Miller | G06Q 10/02 700/11 |
| 2008/0059273 A1* | 3/2008 | Miller | G06Q 10/04 705/7.31 |
| 2009/0157573 A1* | 6/2009 | Anderson | G06N 20/00 706/12 |
| 2009/0216910 A1* | 8/2009 | Duchesneau | G06F 9/5072 709/250 |
| 2010/0036582 A1* | 2/2010 | Kwiatkowski | F02D 41/0002 701/103 |
| 2010/0082848 A1* | 4/2010 | Blocksome | G06F 13/28 710/22 |
| 2010/0254652 A1* | 10/2010 | Kirkpatrick | H04Q 11/0005 385/17 |
| 2010/0254703 A1* | 10/2010 | Kirkpatrick | H04Q 11/0005 398/45 |
| 2011/0039518 A1* | 2/2011 | Maria | H04L 12/66 455/406 |
| 2011/0047545 A1* | 2/2011 | Ellison | G06F 7/588 718/1 |
| 2011/0055194 A1* | 3/2011 | Ghosh | G06F 16/951 707/709 |
| 2011/0173287 A1* | 7/2011 | Blocksome | G06F 15/17331 709/212 |
| 2011/0191547 A1* | 8/2011 | Yoshii | G06F 3/0605 711/147 |
| 2012/0303807 A1* | 11/2012 | Akelbein | G06F 11/3006 709/224 |
| 2013/0006439 A1* | 1/2013 | Selvaraj | G06Q 10/06 700/297 |
| 2013/0074158 A1* | 3/2013 | Koskimies | H04L 63/0428 726/4 |
| 2013/0076140 A1* | 3/2013 | Darden | H02J 3/381 307/64 |
| 2013/0079939 A1* | 3/2013 | Darden, II | H02J 13/0013 700/291 |
| 2013/0079943 A1* | 3/2013 | Darden, II | G06Q 50/06 700/297 |
| 2013/0156425 A1* | 6/2013 | Kirkpatrick | H04B 10/801 398/45 |
| 2013/0205299 A1* | 8/2013 | Shin | G06F 9/4887 718/103 |
| 2013/0272251 A1* | 10/2013 | Schmidt | H04W 72/12 370/329 |
| 2013/0308507 A1* | 11/2013 | Wanstedt | H04W 52/0216 370/311 |
| 2014/0096134 A1* | 4/2014 | Barak | G06F 9/45558 718/1 |
| 2014/0149492 A1* | 5/2014 | Ananthanarayanan | G06F 9/5072 709/203 |
| 2014/0149494 A1* | 5/2014 | Markley | H04L 67/34 709/203 |
| 2014/0149591 A1* | 5/2014 | Bhattacharya | H04L 67/1097 709/226 |
| 2014/0149983 A1* | 5/2014 | Bonilla | G06F 9/45558 718/1 |
| 2014/0172579 A1* | 6/2014 | Peterson | G06Q 30/0269 705/14.66 |
| 2014/0172809 A1* | 6/2014 | Gardella | G06F 16/27 707/705 |
| 2014/0208314 A1* | 7/2014 | Jeswani | G06F 8/65 718/1 |
| 2014/0240607 A1* | 8/2014 | Truong | H04N 5/63 348/730 |
| 2015/0021162 A1* | 1/2015 | Wada | C01B 13/11 204/176 |
| 2015/0149594 A1* | 5/2015 | Lu | H04L 67/10 709/219 |
| 2015/0319182 A1* | 11/2015 | Natarajan | G06F 21/53 726/24 |
| 2016/0077507 A1* | 3/2016 | Sheble | G06Q 10/06 700/295 |
| 2016/0080204 A1* | 3/2016 | Mishra | H04L 41/0853 709/220 |
| 2016/0092194 A1* | 3/2016 | Chhatwal | G06F 8/65 717/170 |
| 2016/0092207 A1* | 3/2016 | Chhatwal | H04L 41/082 717/121 |
| 2016/0092343 A1* | 3/2016 | Chhatwal | G06F 11/3664 717/124 |
| 2016/0170978 A1* | 6/2016 | Michael | G06F 16/214 707/609 |
| 2016/0283844 A1* | 9/2016 | Jones | G05D 23/1917 |
| 2016/0350146 A1* | 12/2016 | Udupi | G06F 9/45558 |
| 2016/0378405 A1* | 12/2016 | Resch | G06F 11/1092 711/114 |
| 2016/0381058 A1* | 12/2016 | Antony | H04L 63/1425 726/23 |
| 2017/0054610 A1* | 2/2017 | Vangala | G06F 11/079 |

OTHER PUBLICATIONS

Fan et al., OPS: Offline Patching Scheme for the Images Management in a Secure Cloud Environment, IEEE, 2013.*

Hashem et al., The rise of "big data" on cloud computing:Review and open research issues, Elsevier, Aug. 2014.*

Bindra et al., Cloud Security: analysis and risk management of VM images, IEEE, Jun. 2012.*

Chang et al., Cloud computing adoption framework: A security framework for business clouds, Elsevier, Oct. 2015.*

Schwarzkopf et al., Checking Running and Dormant Virtual Machines for the Necessity of Security Updates in Cloud Environments, IEEE, 2011.*

\* cited by examiner

SECURITY ENHANCEMENT TOOL FOR A TARGET COMPUTER SYSTEM OPERATING WITHIN A COMPLEX WEB OF INTERCONNECTED SYSTEMS

FIELD OF TECHNOLOGY

This disclosure relates to improving the security of software and hardware deployed in complex environments of 200,000 to 2,000,000 interconnected systems.

BACKGROUND

Currently, system administrators that manage large complex webs of interconnected systems manually schedule system downtime. During system downtime, the system administrator may install software patches and other security enhancing features on the system.

Currently, system administrators also manually search and locate software patches that are relevant to systems under their supervision.

The current methods and system for patching system may destabilize the complex web. For example, two or more system administrators may take multiple systems offline at the same time. Absence of the multiple systems may degrade quality of service delivered by the complex web. Furthermore, while one or more systems are offline, an event may trigger a spike in demand for computational resources of systems within the complex web. System administrators may be unaware, or unable, to bring offline systems online fast enough to prevent degradation in the quality of service provided by the complex web.

Additionally, system administrators may not be aware that a new software patch is available for systems under their supervision. Within larger networks, and certainly within complex webs, a system administrator may not be able to fully appreciate potential ramifications on the larger network when taking a target system offline. Nor may system administrators be able to ascertain an ideal time-window during which to take a system offline.

It would be desirable provide technical improvements to the operation and security of large complex webs of 200,000 to 2,000,000 interconnected systems. It would also be desirable to provide technical improvements to the operation of software and hardware deployed in such complex webs.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
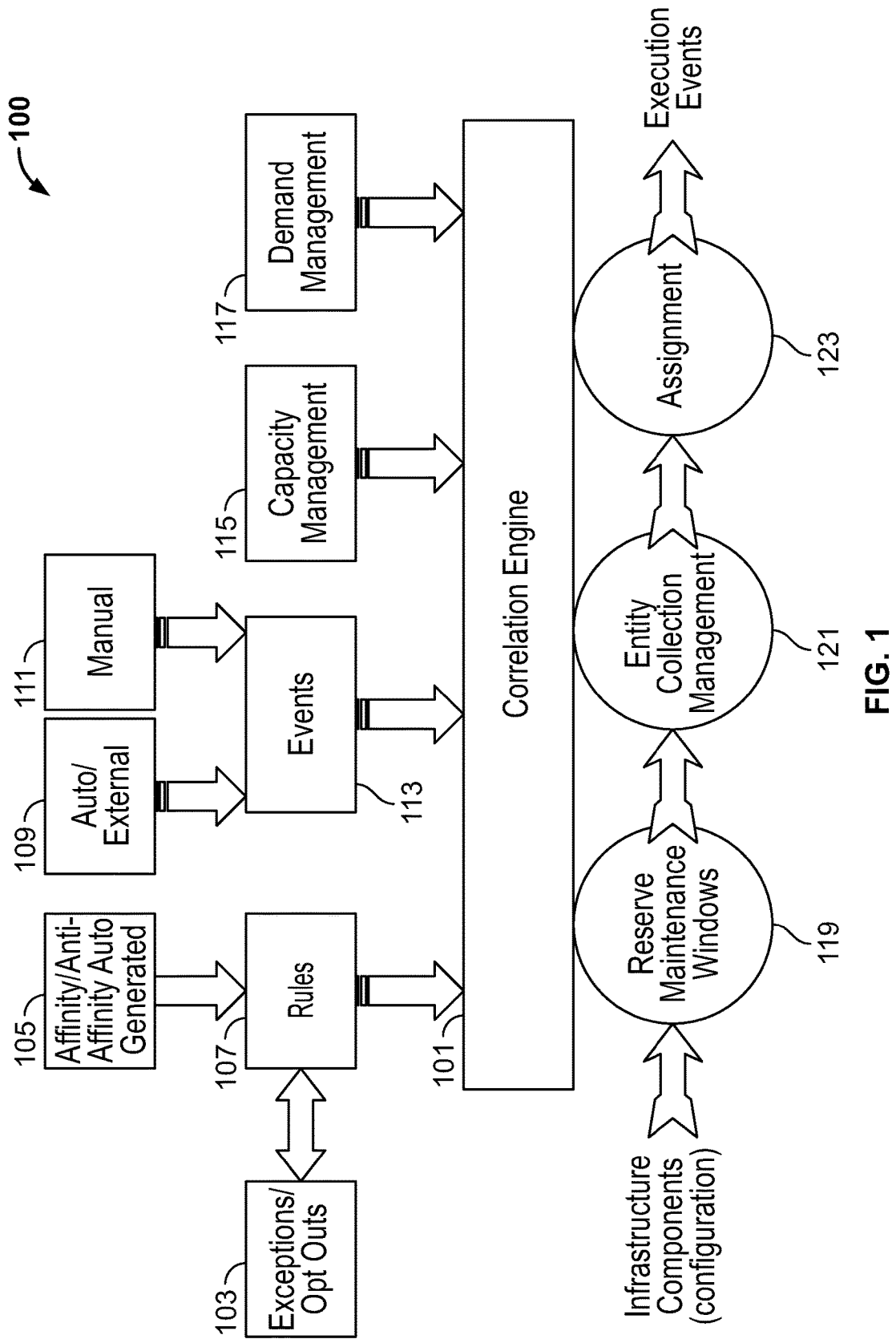
FIG. 1 shows an illustrative process in accordance with principles of the invention.

Apparatus and methods that improve the operation and security of large complex webs of interconnected systems are provided. Apparatus and methods may provide technical improvements to the operation of software and hardware deployed in such complex webs.

A complex web of interconnected computer systems may include any suitable number of computer systems. For example, the complex web may include up to 200,000 computer systems. The complex web may include 2,000,000 or more computer systems. The complex web may be distributed over a plurality of time zones and/or geographic locations.

Apparatus may include an enterprise level software tool. The tool may include a non-transitory machine readable memory. The non-transitory memory may store computer executable instructions. The apparatus may include a processor configured to execute the computer executable instructions. For example, a processor circuit may be embedded in an integrated circuit board of the tool. The processor may control overall operation of the tool and its associated components.

The tool may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the tool to perform various functions. For example, the non-transitory memory may store software used by the tool, such as an operating system, application programs, web browser and a database. Alternatively, some or all of computer executable instructions of the tool may be embodied in hardware or firmware components of the tool.

Software application programs, which may be used by the tool, may include computer executable instructions for invoking user functionality related to communication, such as email, short message service ("SMS"), and voice input and speech recognition applications. Application programs may utilize one or more algorithms that analyze computational loads processed by a target computer system, computational loads processed by the complex web, form system usage matrices (light and dark pods) or any other suitable tasks.

The tool may operate in a networked environment. For example, the tool may support network connections to other systems within the complex web and patch servers storing software patches. The tool may support establishing network connections to one or more remote computers. Such remote computers may be nodes on a network. The network may be within or outside the complex web. The nodes may be personal computers or servers that include many or all of the elements described above relative to the tool. The network connections may include a local area network ("LAN") and a wide area network ("WAN"), and may also include other networks. When used in a LAN networking environment, the tool may be connected to the LAN through a network interface or adapter. The communication circuit may include the network interface or adapter.

When used in a WAN networking environment, the tool may include a modem or other means for establishing communications over a WAN, such as the Internet. The communication circuit may include the modem.

It will be appreciated that the existence of any of various well-known protocols such as TCP/IP, Ethernet, FTP, HTTP and the like is presumed, and the tool can be operated in a client-server configuration to permit a user to retrieve web pages from a web-based server. Web browsers can be used to display and manipulate data on web pages.

The tool and network nodes may include various other components, such as a battery, a speaker, and antennas (not shown). For example, network nodes may be portable devices such as a laptop, a tablet, a smartphone or any other suitable device for receiving, storing, transmitting and/or displaying relevant information.

The tool may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The tool may utilize computer-executable instructions, such as program modules, executed by a computer. Generally, program modules include routines, programs, objects, components, data structures, etc. that perform particular tasks or implement particular abstract data types. The tool may be operational with distributed computing environments where tasks are performed by remote processing devices that are linked through a communications network. In a distributed computing environment, program modules may be located in both local and remote computer storage media including memory storage devices.

The computer executable instructions, when executed by the processor determine a matrix of light and darks pods for one or more target computer systems within the complex web. The matrix may be determined during a pre-determined time period. The pre-determined period on time may be any suitable period of such. Exemplary time periods may include five minutes, an hour, three hours, a day, a week or any suitable time period.

Each light pod may correspond to a time-period during which there is a threshold demand for computational (hardware and/or software) resources of the target computer system. For example, each light pod may correspond to a time-period during which the target computer system is running a greater number of applications than during each dark pod.

The tool may determine a time-sensitive window. The time-sensitive window may hereinafter be referred to alternatively as a "maintenance window." The time-sensitive window may be determined based on the matrix. The time-sensitive window may be determined based on a group of matrices. For example, the tool may group two or more target computer system associated with matrices indicating that each of the systems is generally inactive during a time period. The inactive time period may correspond to the time-sensitive window. The time-sensitive window may be large enough to install one or more software patches on each of the grouped target systems.

The time-sensitive window may include a subset of the light pods and dark pods in a matrix associated with each computer system within the complex web. During the time-sensitive window, a target computer system may be disconnected from the complex web without disrupting a computational load processed by the complex web during the time-sensitive window.

Disconnecting the target system may include taking the target computer system offline. When the target system is disconnected or offline, the target system may not be accessible to other systems part of the complex web. When the target system is disconnected or offline, the target system may not contribute computational resources to the complex web. When the target system is disconnected or offline, the target system may not run applications typically run by the target system.

The tool may disconnect one or more target computer systems from the complex web during its respective time-sensitive window. During a time each target computer system is disconnected from the complex web, the tool may connect each target computer system to a remote server. The remote server may push patches or other information to the target systems. The patches may correct one or more security flaws associated with software and/or hardware running on each target computer system.

For example, the remote server may store one or more software patches for applications used by a target computer system. While the target computer system is disconnected from the complex web, the one or more patches may be installed on the disconnected target system.

The tool may group a plurality of interconnected computer systems (within the complex web) based on a matrix of light and dark pods associated with each computer system. For example, the tool may group one or more computer systems together based on each system being associated with a threshold number of light and/or or dark pods. The group may form a target group. The target group may be scheduled to be collectively disconnected from the complex web during a time-sensitive window that includes a threshold number of dark pods.

As a further example, each computer system within a group may include a matrix having a threshold number of light and/or dark pods within a predetermined time period. As a further example, each computer system within a target group may be associated with a matrix having a threshold number of consecutive light and/or dark pods.

A preferable time-sensitive window includes only dark pods. Dark pods may indicate that one or more applications run by a target computer system are generally dormant during the time-sensitive window. Disconnecting the computer system during such a time-sensitive window may have little to no operational effect on other systems within the complex web.

In some embodiments, the time-sensitive window may include a plurality of dark pods and at least one light pod. The light pods may correspond to time during which applications are actively running and/or the target system is communicating with other systems within the complex web. Thus, disconnecting the target system during a time-sensitive window that includes one or more light pods may have a greater detrimental operational effect on other systems within the complex web than disconnecting the target system during a time-sensitive window that includes only dark pods.

The one or more cybersecurity flaws may include a fatal flaw. When the tool determines that the flaw associated with a target system is fatal, the tool may disconnect the target system during a time-sensitive window that includes more light pods than dark pods. When the tool determines that the flaw associated with a target system is fatal, the tool may not allow a scheduled time-sensitive window to be postponed.

Apparatus for an enterprise level software tool that disconnects a target computer system from a complex web of interconnected computer systems is provided.

The tool may include a non-transitory machine readable memory storing computer executable instructions. The computer executable instructions, when executed by a processor, implement a first subroutine, a second subroutine, a third subroutine, and a correlation subroutine. Collectively, the subroutines, when executed by the tool, disconnect the target system and maintain operational stability of the complex web.

The first subroutine may determine a target level of operational readiness for the target computer system. The target level of operational readiness may be determined for a pre-determined time period. For example, the pre-determined timeframe may be less than a day, a day, a week, two weeks, a month, twenty months or any suitable time period.

The second subroutine may determine computational resources required by the target computer system to achieve and/or maintain the target level of operational readiness (determined by the first subroutine).

The third subroutine may monitor for a plurality of events. Each of the events monitored by the third subroutine may, if detected, alter the target level of operational readiness during the pre-determined time period. The events may include unexpected news events. Such unexpected events may trigger a higher than usual demand for computing resources supplied by a target system.

The correlation subroutine may determine, based on the target level of operational readiness (determined by the first subroutine) and the determined computational resources (determined by the second subroutine), a time-sensitive window during which the target computer system is scheduled to be disconnected from the complex web. The third subroutine may calculate a time-sensitive window such that when the target system is disconnected from the complex web during the time-sensitive window, there is little or no detrimental effect on the operational readiness of any other computer system within the complex web.

A size of the time-sensitive window may be determined based on a size of a stack of software patches that is available to be installed on the target computer system. The stack of software patches may cure one or more security flaws of the target computer system.

The correlation subroutine may also reserve the time-sensitive window for the target computer system. By reserving the time-sensitive window, the correlation subroutine may prevent any other of the interconnected computer systems from reserving the time-sensitive window. By reserving a time-sensitive window for a first target system, the tool may take account of the first target system being offline before scheduling a second time-sensitive window for a second system.

At a start of the time-sensitive window, the correlation subroutine may disconnect the target computer system from the complex web. During the time-sensitive window, the tool may install a stack of software patches on the target computer system.

The time-sensitive window may be a first time-sensitive window. The correlation subroutine may receive a request to reschedule the first time-sensitive window. The request to reschedule may be a system request or a manual request.

For example, the third subroutine may continuously monitor for any of a plurality of events up to a start of a first (originally scheduled) time-sensitive window. In response to detecting at least one of the plurality of events, the tool may dynamically reschedule the time-sensitive window. The one or more events may alter the target level of operational readiness for the target system during the pre-determined time period. The rescheduling may postpone a disconnecting of the target computer system. The rescheduling may disconnect the target computer system before a start of the time-sensitive window.

As a further example, taking the target computer system offline may divide a group of computer systems into two or more groups. The subdivision of the group may increase a total number of system groups. The increased number of system groups may exceed an allowable number of computer systems that may be supervised by a systems administrator. The system may postpone disconnecting a target computer system until additional system administrators are available to supervise the increased number of computer systems. The system may postpone disconnecting the target computer system until the target and/or other computer systems are regrouped such that a total number of computer systems do not increase when the target system is disconnected.

In response to receiving a rescheduling request, the tool may determine if a second time-sensitive window is available. For example, a second time-sensitive window may only be "available" if the second time-sensitive window will begin within 90 days (or any other suitable time-period) of an end of the first time-sensitive window.

When the second time-sensitive window is available, the tool dynamically reschedules the first time-sensitive window. For example, in lieu of the first time-sensitive window, the tool may associate the target computer system with a second time-sensitive window. The second time-sensitive window may be scheduled to begin within 90 days of the end of the first time-sensitive window.

The tool may limit a number of times the time-sensitive window may be rescheduled. For example, the tool may only allow the time-sensitive window to be rescheduled a maximum of three times.

When the target computer system is disconnected from the complex web or otherwise taken offline (e.g., during a time-sensitive window), the tool may connect the target computer system to a remote patch server. The remote patch server may install, or initiate installation, of a stack of software patches on the target computer system.

Apparatus for an enterprise level software tool is provided. The tool may include a non-transitory machine readable memory storing computer executable instructions. The tool may include a processor configured to execute the computer executable instructions.

The tool may take a target computer system, operating within a complex web of interconnected computer systems, offline. Taking the target computer system offline may include disconnecting the target system from the complex web. The complex web of interconnected computer systems may include any suitable number of computer systems. For example, the complex web may include between 200,000 and 2,000,000 computer systems. The complex web of computer systems may be distributed over a plurality of time zones.

The tool may take the target computer system offline without disturbing an operational equilibrium of the complex web. For example, the tool may not take a target system offline more than a predetermined percentage of computational capacity associated with an application. The tool may not take a target system offline without arranging for the availability of redundant pairs of infrastructure designed to provide resiliency within the complex web. The tool may take components of the target computer system offline in a specific defined order or at specific intervals.

While the target computer system is offline, the tool may update software and/or hardware of the target computer system.

The tool may receive a plurality of operational rules associated with the target computer system. The operational rules may dictate a target level of operational readiness for the target computer system. Operational readiness may be different for each target computer system. For example, operational readiness may include hours of availability. Operational readiness may determine components of a target computer system may are linked together.

Based on the operational readiness, a size of the time-sensitive window may be determined. For example, the time-sensitive window may be scheduled such that the target system is still available for the requisite hours of available. As a further example, the time-sensitive window may be determined such that all linked components of a target computer system are taken offline and patched together.

The tool may monitor for a plurality of events that raise the target level of operational readiness for the target computer system. The tool may determine, based on the rules and the plurality of events, an expected computational demand, by other systems within the complex web, for resources of the target computer system.

The tool may determine, based on the expected demand, an expected computational capacity of the target computer system needed to service the expected demand of the complex web. Based on the expected computational capacity, the tool may determine a time-sensitive window during which the target computer system may be taken offline without compromising operational integrity of the other interconnected computer systems within the complex web. The time-sensitive window may be determined based on a geographic location and/or a time zone associated with the target computer system.

The tool may reserve the time-sensitive window for the target computer system. By reserving the time-sensitive window, the tool may prevent other computer systems (within the complex web) from attaching to the time-sensitive window associated with the target computer system.

At a start of the time-sensitive window, the tool may take the target computer system offline. The tool may dynamically reschedule the time-sensitive window in response to detecting at least one of the plurality of events that raises the target level of operational readiness of the complex web generally, or for the target computer system specifically.

The tool may receive an override command to postpone the time-sensitive window. In response to receiving the override command, the tool may dynamically reschedule the time-sensitive window. The tool may limit a number of times the time-sensitive window may be rescheduled.

The tool may include a patch sub-system. The patch sub-system may obtain one or more software patches for each interconnected computer system within the complex web. When the target computer system is taken offline, the tool may connect the target computer system to the patch sub-system. When the patch sub-system is connected to the target system, the patch sub-system may push a stack of software patches to the target computer system.

Before the target computer system is taken offline, the patch sub-system may identify one or more software applications running on the target computer system. The patch sub-system may activate an application program interface ("API"). The API may connect to one or more remote servers that each store at least one software patch. Each software patch may cure a security flaw in the one or more software applications running on the target computer.

The API may obtain a copy of a software patch from one or more of the remote servers. The remote servers may stack software patches available for a target system. When a stack of software patches exceeds a pre-determined threshold, the patch sub-system may initiate a request that the tool schedule a time-sensitive window for the target system. During the time-sensitive window, the patch sub-system may push the stack of patches to the target computer system. During the time-sensitive window (e.g., while the target system is offline) the patch sub-system may initiate installation of the stack of software patches on the target system.

The tool may determine a size of a time-sensitive window based on time and computational resources needed to install the stack of software patches on the target computer system during the time-sensitive window.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative data-flow process 100. Process 100 shows inputs 103-117 that may be processed by correlation engine 101. Correlation engine 101 may include one or more hardware, software and/or network components described herein.

The inputs may include various characteristics of interconnected systems within a complex web of systems. Based on the inputs associated with each system within the complex web, correlation engine 101 may determine outputs 119-123 for each system.

Input 105 includes affinity/anti-affinity associated with a target system. Affinity in the context of this disclosure may refer to a group of computer systems within the complex web. For example, a target system may be part of a group of systems that collectivity provide one or more outputs to other systems (or groups of systems) within the complex web. Anti-affinity may correspond to the absence of any specific grouping associated with a target system.

As a further example, a single application may be run by multiple systems. When a software patch is available for the single application, each of the systems running the application may need to be disconnected from the complex web to install the patch.

Affinity 105 may be input into rules 107. Rules 107 may evaluate possible ramifications of splitting up a system group. For example, splitting up a group may increase a total number of system groups. The increased number of groups may exceed a total number of systems that may be supervised by a systems administrator. As a further example, installation of a software patch may require that one or more systems (or all systems) in the group be disconnected from the complex web concurrently. Disconnecting an entire group may require a larger time-sensitive window. Disconnecting an entire group may require a time-sensitive window to be scheduled during a specific time, such as during periods of very low system activity (e.g., high number of dark pods).

Illustrative inputs include exceptions 103. For example, correlation engine 101 may assign a time-sensitive window to a target system. A system administrator responsible for the target system may enter an input requesting that a scheduled time-sensitive window be postponed. In some embodiments, correlation engine 101 may postpone a scheduled time-sensitive window. For example, the scheduled time-sensitive window may overlap with an event 113 that requires the target system to remain online.

Rules 107 may include schedules that are known to be associated with system demands or lack thereof. For example, rules 107 may include financial market schedules in various countries. In some countries, financial markets may be closed on Sundays and Saturdays. In some countries, financial markets may be closed on Fridays. Based on rules 107, correlation engine 101 may determine a time-sensitive window for disconnecting a target system based on specific rules for the geographic location the target system services.

Illustrative inputs include events 113. Events 113 may include manually scheduled events 111. Exemplary manually scheduled events may include events that are historically known to require computing power of a target system. Because the target system is needed during the event to maintain a threshold level of quality of service, the target system may not be disconnected from the complex web during the event. In some embodiments, correlation engine 101 may prevent the target system from being disconnected from the complex web for a period of time before and/or after an event.

Events 113 may include system detected events 109. System detected events 109 may not be historical events. For example system detected events 109 may include dynamic detection of a threshold demand for computing resources of a target system. Such demand may be triggered by an unexpected news event. Computing resources may include demand for an application running on the target system. In some embodiments, system detected events 109 may include statistically predicted events. System detected events 109 may include power or communication disruptions.

Capacity management input 115 may include computing capacity of one or more systems of system groups. For example, computing capacity may refer to an ability of an application running on a target system to process a threshold number of service requests within a predetermined time period.

Demand management input 117 may include expected demand for computing capacity. Demand management input 117 may adjust expected demand based on time of day, location, or any other suitable criteria.

Each of inputs 103-117 may be received, directly or indirectly, by correlation engine 101. Based on inputs 103-117, correlation engine 101 may determine a time-sensitive window for disconnecting a target system (or group of systems) from a complex web of interconnected systems. Correlation engine 101 may determine a time-sensitive window that, based on inputs 103-117, is not expected to overtax demand or capacity requirements of the complex web.

Correlation engine 101 may produce one or more outputs 119-123. Correlation engine 101 may output maintenance window reservation 119. Maintenance window reservation 119 may be associated with a target system.

Entity collection management 121 may coordinate maintenance window reservations across two or more target systems. Entity collection management 121 may ensure that two or more target systems are not disconnected from the complex web during overlapping time-sensitive windows. Entity collection management 121 may ensure that two or more target systems are not disconnected from the complex web at the same time if disconnecting both systems would disrupt an ability of the complex web to provide a threshold level of quality of service.

Figure 2:
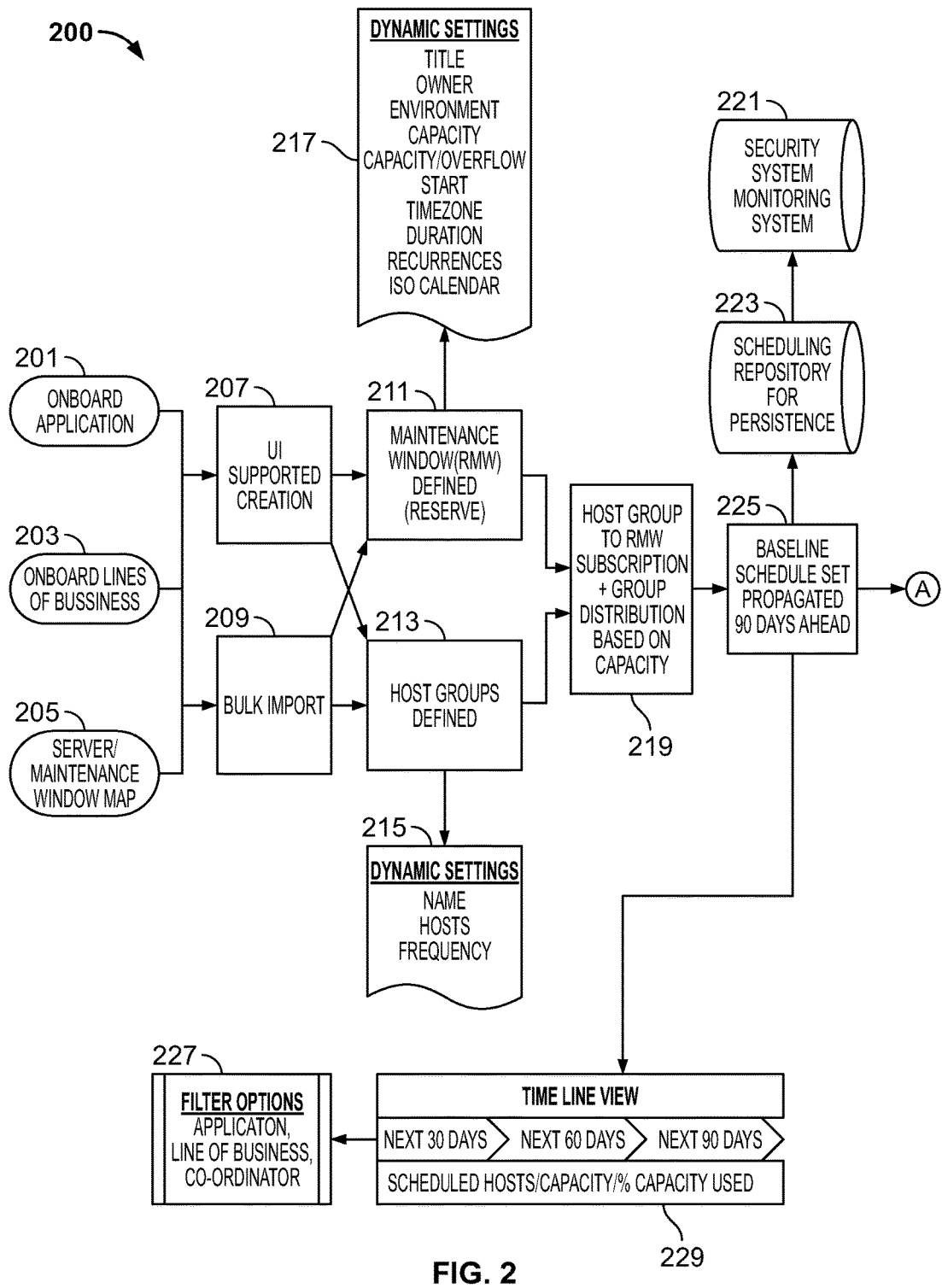
FIG. 2 shows an illustrative process in accordance with principles of the invention.
Figure 2:
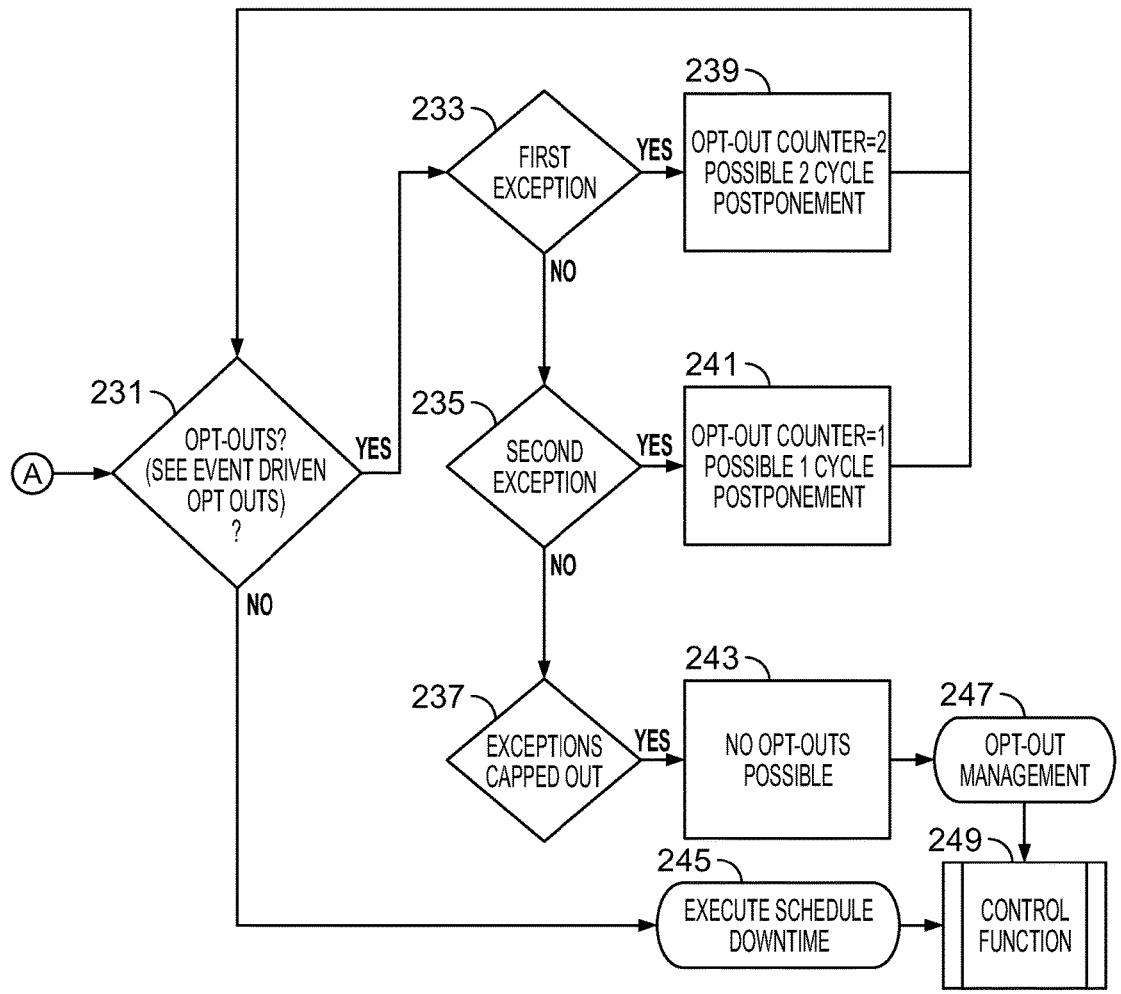

FIG. 2 shows illustrative process flow 200. For the sake of illustration, one or more of the steps of the process illustrated in FIG. 2 will be described as being performed by a "system." The "system" may include one or more of the features of apparatus (software and/or hardware) or processes described herein and/or any other suitable device or approach. The "system" may be provided by an entity.

Process flow 200 may begin based on information 201, 203 and 205. Information 201 includes applications running on a target system. Information 201 may include the identity of such applications. Information 201 may include the computational resources needed to run such applications. Information 203 includes lines of business that utilize the applications identified in 201. Information 205 includes a map of currently defined server/maintenance windows.

At step 207, the system provides a user interface for creation of a maintenance window associated with a target system. A user of the interface provided at step 207 may be an administrator responsible for operation of the target system. In some embodiments, a system may be the user of the interface. Thus, maintenance windows for a target system may be reserved using without any administrator or other human intervention.

At step 209, the system receives a bulk import of information 201-205. The bulk import may be received for one or more target systems within the complex web. The bulk import may be received for systems that form a group within the complex web.

At step 211, the system defines a reserved maintenance window for the target system. Reserving a maintenance window may correspond to setting a size or duration of a time-sensitive window. Reserving the maintenance window may also include setting the start date/time of a time-sensitive window and recurrence rules of that window. An exemplary recurrence rule may schedule a maintenance window the first day of every month. The target system may be taken offline or otherwise disconnected from the complex web for up to the duration of the time-sensitive window.

The reserved maintenance window may be defined to be large enough to install security updates for one or more applications running on the target system. The reserved maintenance window may be defined for a group of systems. For example, based on bulk data import 209, a single reserved maintenance window may be defined for the group.

Process 200 shows that reserved maintenance window may be defined based on dynamic settings 217.

At step 213, host groups are defined. Host groups may include two or more target systems than need to be updated. The host group may share some commonality that allows them to be grouped together, disconnected together and patched within the same maintenance window. For example, members of a group may include components of a target system, systems supported by the same system administrator group, or any other suitable factors. The host group may include systems that host one or more patches required by applications running on a target system. The host group may be remote from the complex web.

The host group may be defined based on dynamic settings 215. Dynamic settings 215 may include information made available by an entity that maintains one or more software applications running on the target system.

At step 219, the appropriately sized reserved maintenance window (determined at step 211) is linked to the host group (defined at step 213). At step 225, a baseline schedule is set. The baseline schedule may set a time (e.g., during a time-sensitive window) for disconnecting the target system from the complex web and updating applications running on the target system. The schedule may be set at least 90 days prior to the scheduled time-sensitive window.

Step 211 may include settings for a recurring maintenance window, (e.g., on the 1st day of every month. At step 219, the system may schedule the recurring maintenance windows (e.g., January 1, February 1, March 1, etc.)

At step 223, the system stores the schedule set at step 225. The stored schedule may be referenced by the system when attempting to schedule a time-sensitive window for another target system. At step 221, a security monitoring sub-system may track scheduled reserved maintenance windows. The stored schedule may be correlated to actual security updates performed on the target system. The correlation may generate metrics that demonstrate an overall security enhancement (or lack thereof) for systems within the complex web.

At step 229, a timeline of scheduled reserved maintenance windows is generated. The timeline may be generated based on the schedule determined at step 225 for one or more target systems. The timeline may be viewed based on various criteria such as time (30 day, 90 days etc. . . . ), scheduled hosts, computational capacity of the scheduled target system and/or percentage computational capacity associated with the scheduled hosts.

At step 227, scheduled reserved maintenance windows may be filtered based on illustrative criteria such as application, line-of-business (associated with the application or target system), administrative personal responsible for the target system or any other suitable criteria.

At step 231, the system monitors for "opt-outs" associated with a target system. An opt-out may postpone disconnection of a target system during a scheduled and reserved maintenance window. For example, as a result of an unexpected news event, a maintenance window may be rescheduled. As a further example, a systems administrator responsible for the target system may manually enter an opt-out command.

If no opt-out command is received, at step 245, the system executes the scheduled maintenance window and disconnects the target system during the maintenance window. At step 249, a control function is executed.

The control function may connect the target system to a remote patch server storing one or more patches for the applications running on the target system. The remote patch server may push the one or more patches to the target system. The remote patch server may initiate installation of the one or more patches on the target system while the target system is disconnected from the complex web.

At step 233, the system receives a first exception requesting postponement of the scheduled maintenance window. At step 239, the system increments a counter that tracks a number of exceptions for a scheduled maintenance window associated with a target system.

At step 235, the system receives a second exception requesting another postponement of the scheduled maintenance window. At step 241, the system increments the counter that tracks the number of exceptions associated with the scheduled maintenance window.

At step 237, the system receives a third exception requesting postponement the scheduled maintenance window. Process 200 shows that in some embodiments, the system does not allow more than three exceptions. At step 243, the system detects that no further exceptions are allowed. At step 247, if no further exceptions are available, the system transfers control to an opt-out management module.

The opt-out module at step 247 may override instructions to reschedule a maintenance window associated with a target computer system, (and pass it to the control function at step 249 for processing). Such an override may occur when a fatal security flaw cured by an available patch. The opt-out module at step 247 may allow a maintenance window to be rescheduled and determine another maintenance window for patching the target system.

At step 249, a control function 249 may execute. Control function may disconnect the target system and update one or more applications running on the target system.

Figure 3:
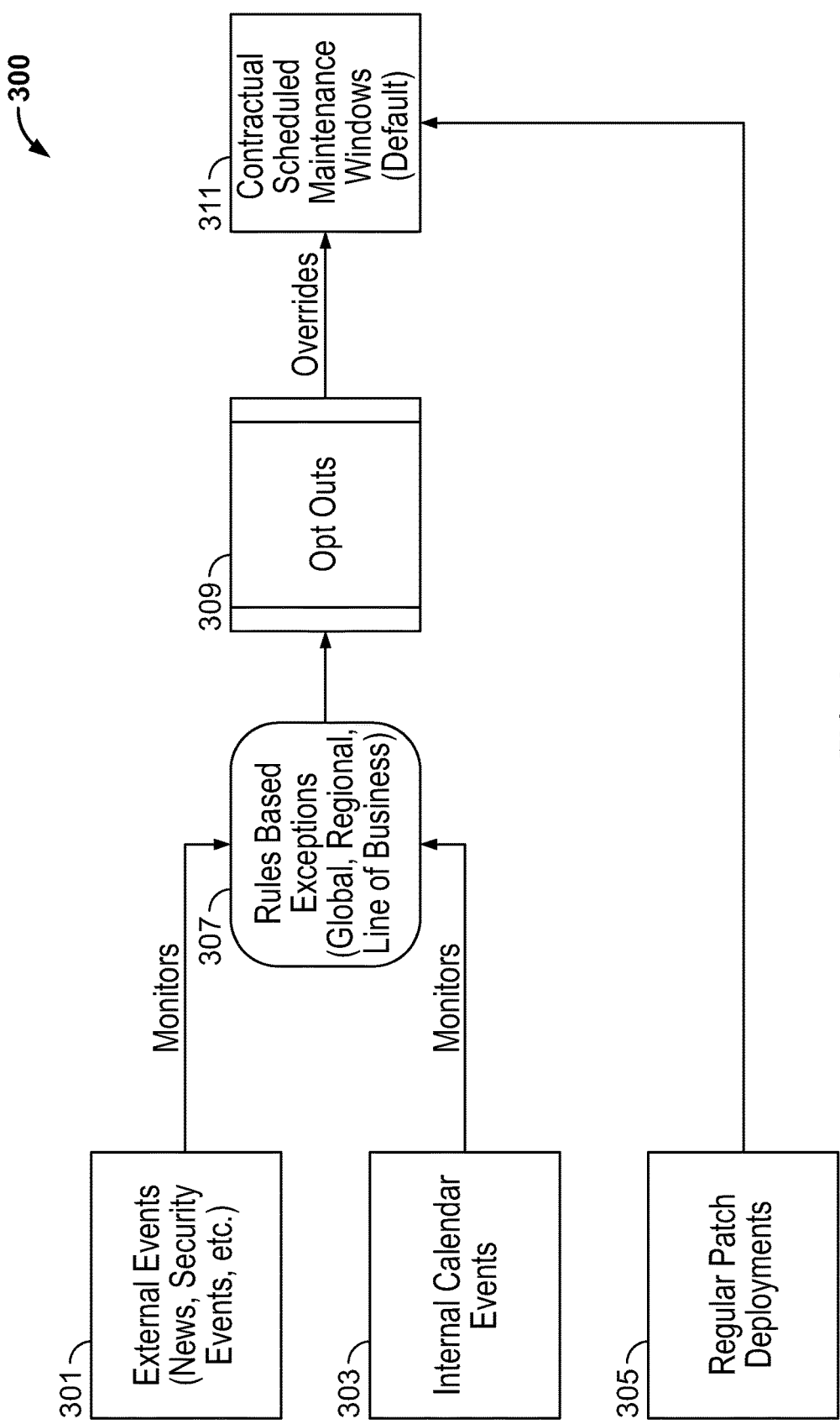
FIG. 3 shows an illustrative process in accordance with principles of the invention.

FIG. 3 shows an illustrative process 300. Process 300 shows illustrative steps that may be performed prior to implementing a scheduled maintenance window. For the sake of illustration, one or more of the steps of the process illustrated in FIG. 3 will be described as being performed by a "system." The "system" may include one or more of the features of the apparatus (software or hardware) or processes described herein and/or any other suitable device or approach. The "system" may be provided by an entity.

At step 301, the system monitors and detects external events. Such external events may be detected before disconnecting a target system. Illustrative external events may include breaking news, expected press releases, power and/or communication disruptions. External events may include notices that patches are available for one or more applications running on a target system. External events may include notices that one or more applications running on a target system are vulnerable to one or more security risks.

At step 303, the system monitors and detects internal events. Illustrative internal events may include detected and/or expected demand for computational resources. For example, at certain times of day and in response to specific market conditions, more or less computation resources may be required to provide a threshold level of quality of service. In response to detection of an internal event, a maintenance window may be scheduled to begin after an expected conclusion of the internal event.

Internal events may include a "freeze" imposed on a target system. A system administrator may change one or more settings (software and/or hardware) of a target system and may wish to evaluate subsequent performance of the target system. During an evaluation period, the systems administrator may impose a "freeze" on the target system. Imposition of the freeze may require that no changes be made to software or hardware of the target system.

At step 305, the system monitors and detects for regularly scheduled patch deployment. Information regarding scheduled patch deployment may be circulated by a remote patch server.

At step 307, the system monitors for rules based exceptions to implementation of a maintenance window. Such exceptions may be associated with a region in which the target system operates. Such exceptions may be associated with a line-of-business that is serviced by the target system.

For example, certain regions or lines-of-business may require system with minimal downtime or service "mission critical" functions. Systems in such regions may only be disconnected within narrowly defined or smaller sized maintenance windows. Another example may include systems and applications that serve trading or market activities. Such system may preferably only be taken offline on days when such markets are closed. A further example may include systems and applications that provide information to external entities such as vendors or regulatory agencies. Such system may preferably only be taken offline during mutually agreed upon timeframes.

At step 309, the system checks if any opt-outs have been received. At step 311, the system finalizes a scheduled maintenance window. A target system may be taken offline at any time during the maintenance window. If less than an allowed number of opt-outs have been received the maintenance window may be postponed.

Figure 4:
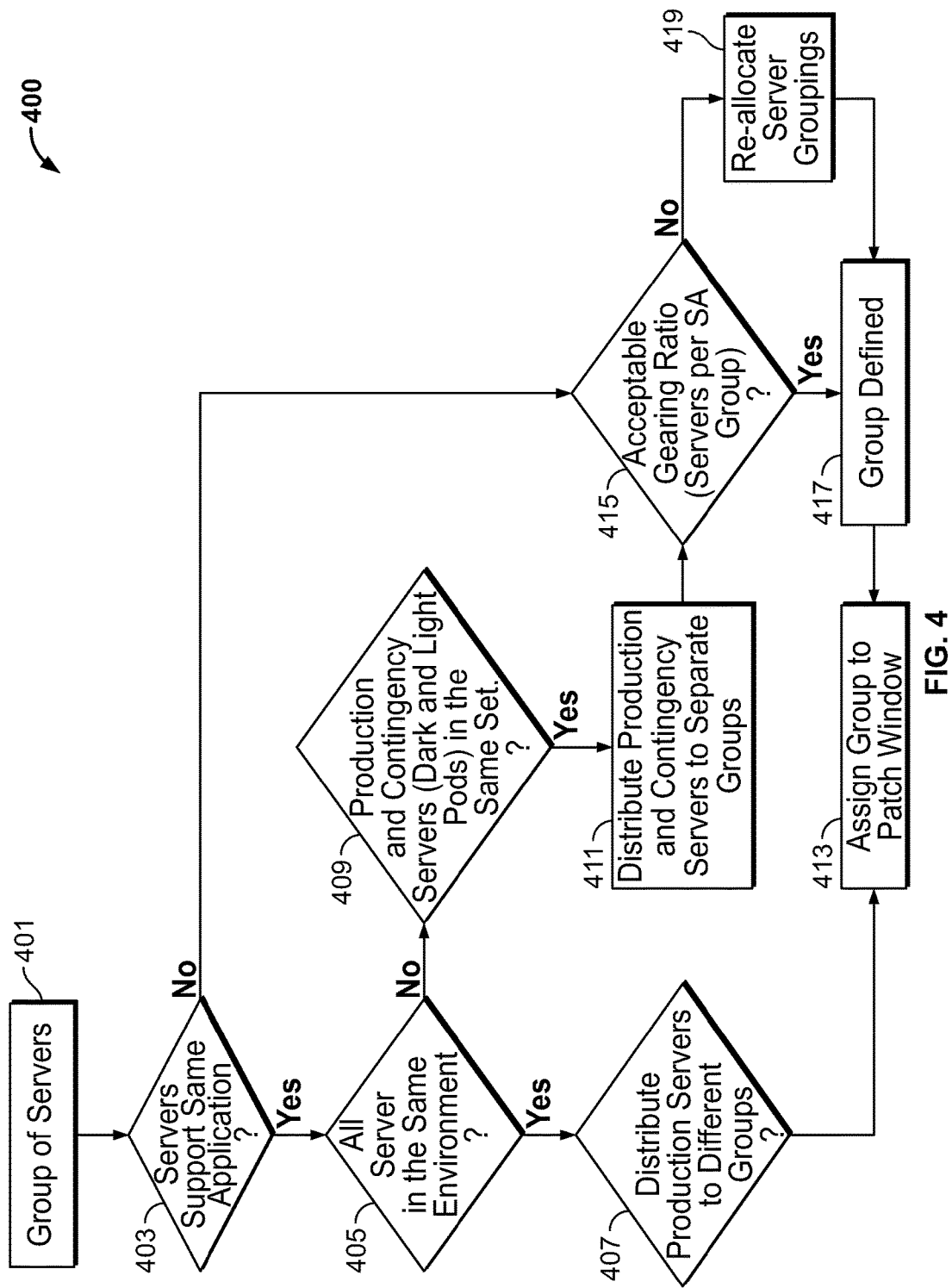
FIG. 4 shows an illustrative process in accordance with principles of the invention.

FIG. 4 shows illustrative process 400. Process 400 shows illustrative steps that may be performed prior to implementing a scheduled maintenance window. For the sake of illustration, one or more of the steps of the process illustrated in FIG. 4 will be described as being performed by a "system." The "system" may include one or more of the features of the apparatus (software or hardware) or processes described herein and/or any other suitable device or approach. The "system" may be provided by an entity.

Process 400 may begin at step 401. At step 401, a group of servers is identified. The group of servers may be identified based on geographical location. The group of servers may be randomly identified. The group of servers may be identified based on being due for periodic maintenance. For example, the servers in the group may not have been updated within a threshold time period.

At step 403, the system determines whether one or more members in the group of servers service the same applications. If the members of the group do not service the same applications, then at step 415 the system determines whether taking the servers in the identified group offline will cause an unacceptable gearing ratio. A gearing ratio may correspond to groups of system under the supervision of a system administrator.

Taking a target server offline may require splitting one or more groups of servers to allow the target server to be extricated from the group. Splitting a group may increase a number of systems under the supervision of a system administrator. The increased number may exceed an acceptable or allowable gearing ratio.

At step 419, if an acceptable gearing ratio has been exceeded, the system reallocates the server grouping (identified at step 401). Reallocating the server grouping may include reducing the number of servers in the target group. Reallocating the server grouping may include assigning additional system administrators to systems associated with a line-of-business. Reallocating the server grouping may include merging newly created system groups (as a result of taking a target system offline) into other groupings.

At step 417, a group of servers to be taken offline is finally defined. At step 413, the group of servers is assigned a patch or maintenance window. During the patch or maintenance window members in the group may be taken offline and appropriately patched.

At step 405, if members of the target server group each support identical (or related) applications, the system determines if all servers in the group operate in the same environment. At step 409, if the members in the target server group do not operate in the same environment, the system determines whether members in the target group include production and contingency servers. At step 411, if the target group includes production and contingency servers, the target group is split.

Splitting the target group may ensure that contingency and production servers are not both taken offline at the same time. The system may be programmed to assign contingency and production servers mutually exclusive maintenance windows. Contingency servers may be needed when one or more production servers are taken offline. Contingency and production servers may be identified by having mirror images of light and dark usage pods. For example, a contingency server may be active (light pods) when the production server is inactive (dark pods). Similarly, a contingency server may be inactive (dark pods) when a production server is active (light pods).

At step 407, if members of the target group operate in a homogenous environment, the system also redistributes the target group. Taking a target group of severs offline during a single time-sensitive window may unbalance computational equilibrium of a complex web. After a balanced target group is formed, at step 413, the resulting target group is assigned a patch or maintenance window. During the patch or maintenance window, members in the group will be taken offline and appropriately patched.

Figure 5:
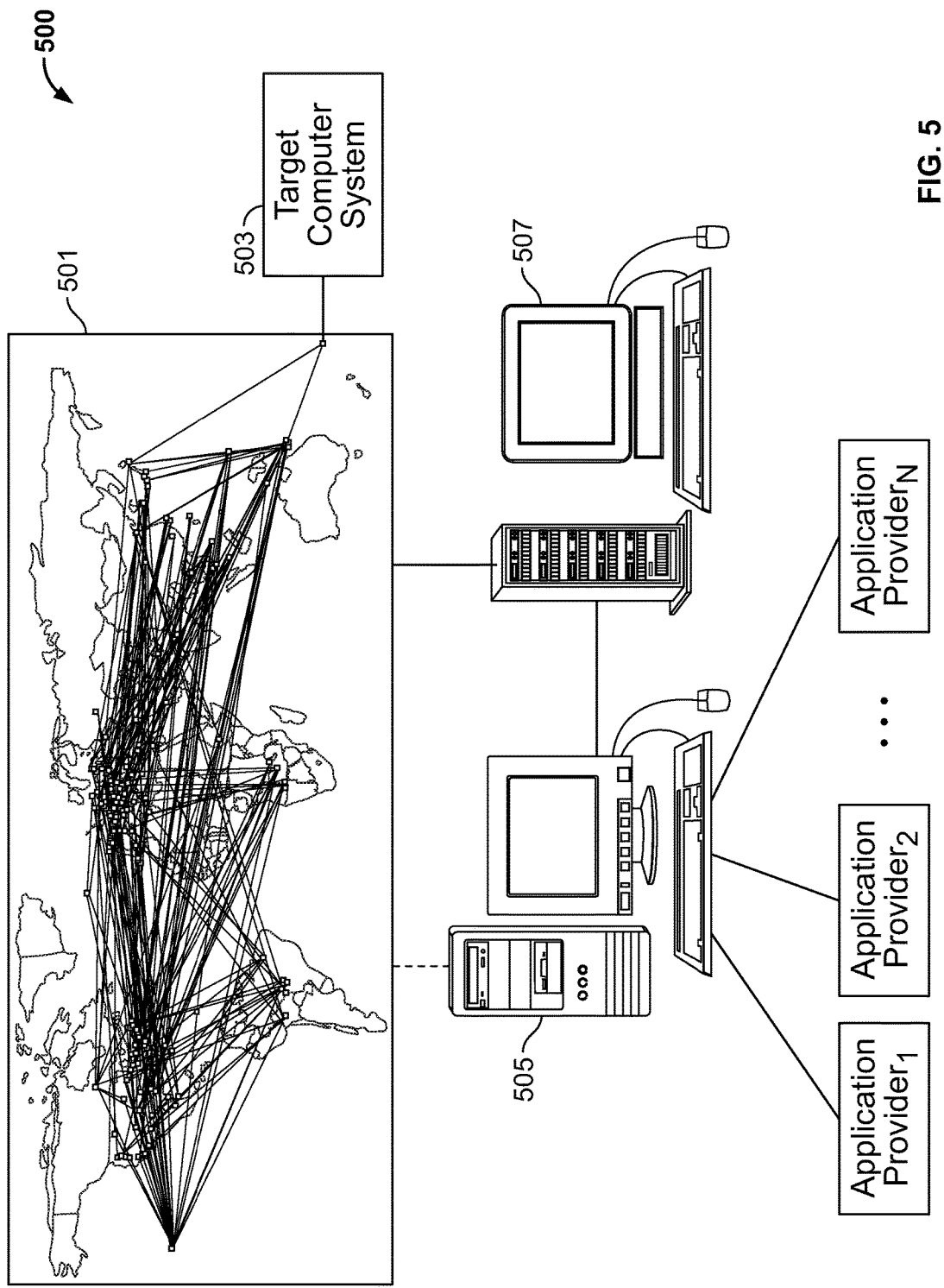
FIG. 5 shows an illustrative network topology in accordance with principles of the invention.

FIG. 5 shows illustrative system architecture 500. Architecture 500 includes complex web 501. Complex web 501 includes multiple interconnected systems. Systems within complex web 501 may be distributed across different geographic locations and time zones.

Architecture 500 includes target system 503. Target system 503 may be a single target server. Target system 503 may be a target group of servers. Target system 503 may be identified using one or more of the processes shown above in FIGS. 1-4.

Architecture 500 includes enterprise level tool 507. Tool 507 may include hardware. Tool 507 may include software. Tool 507 may be configured to identify a target system by implementing one or more of the processes shown above in FIGS. 1-4.

Architecture 500 includes patch server 505. Patch server 505 may be configured to locate and download one or more patches associated with applications or hardware running on one or more systems within complex web 501. For example, patch server 505 may be configured to locate and download one or more patches associated with applications running on target system 503.

Tool 507 may monitor patches stacked by patch server 505. When patches stacked by patch server 505 associated with applications running on target system 503 exceed a threshold, tool 507 may identify target system 503. Target system 503 may schedule a maintenance window for target system 503. The scheduled maintenance window may be determined using one or more of the processes shown above in FIGS. 1-4.

Target system 503 may be disconnected from complex web 501 during the maintenance window. Tool 507 may identify target system 503 and assign target system 503 a maintenance window such that when target system 503 is taken offline (e.g., disconnected from complex web 501) performance of computational services provided by complex web 501 is not compromised. During the maintenance window, the stack of patches may be installed on target system 503.

Figure 6:
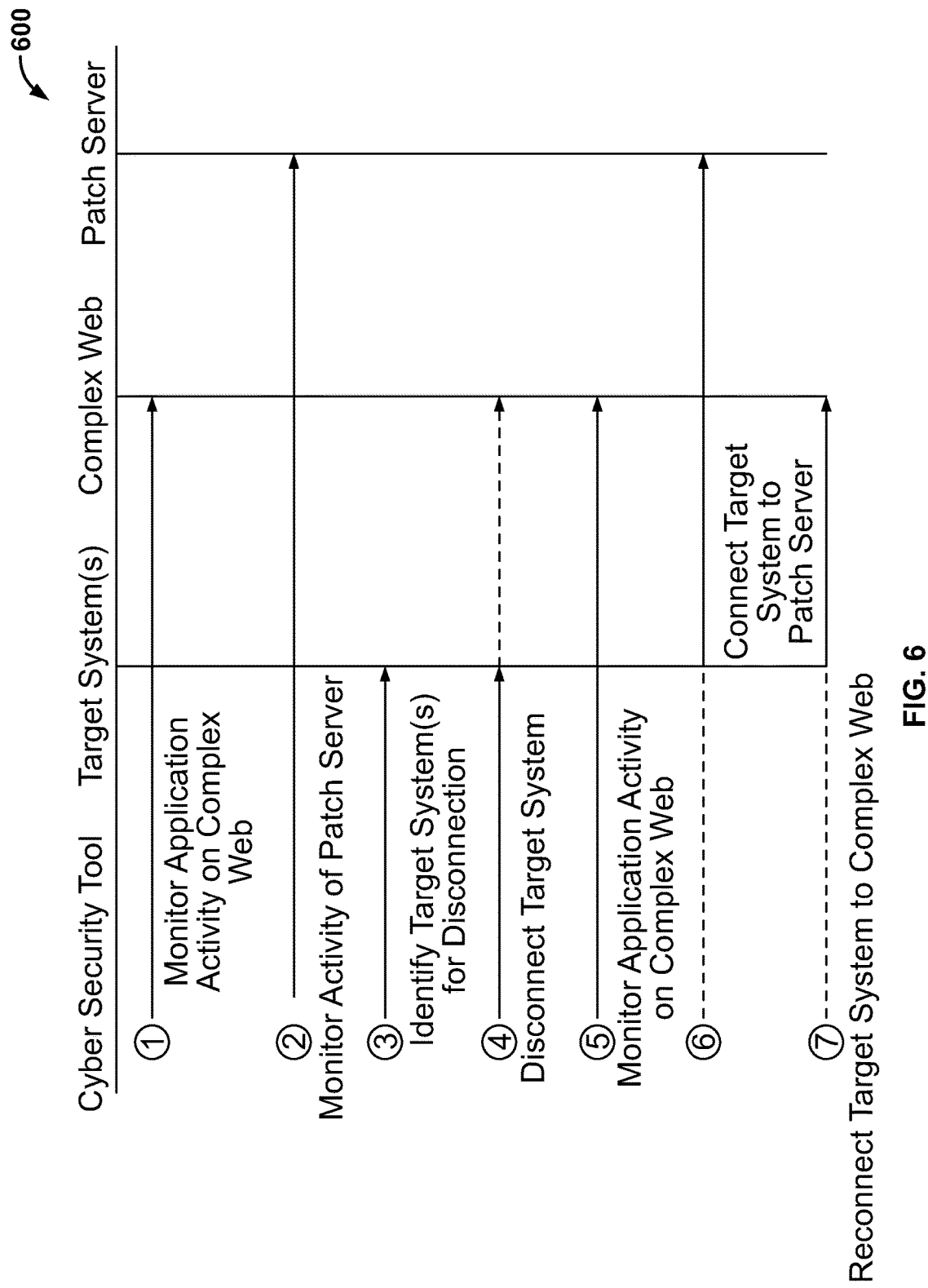
FIG. 6 shows an illustrative process in accordance with principles of the invention.

FIG. 6 shows illustrative network flow 600. Network flow 600 shows illustrative instructions that may be issued by a cyber security tool such as tool 507 (shown above in FIG. 5).

Network flow 600 begins at step 1. At step 1, the tool monitors application activity on a complex web, such as complex web 501 (shown in FIG. 5). Application activity may include which applications are active at different times. The tool may monitor application activity over a predetermined time period.

At step 2, the tool monitors activity of a patch server, such as patch server 505 (shown in FIG. 5). The tool may monitor activity of the patch sever and detect when critical software patches are available. The tool may monitor the patch sever and detect when a threshold number or stack of software patches are available.

At step 3, the tool identifies target systems within the complex web. The target systems may be identified based on running applications that require patching. The target systems may be identified based on availability of a time-sensitive window during which the target systems may be disconnected from the complex web.

At step 4, the tool disconnects the target systems during the time-sensitive window. At step 5, the tool monitors application activity on the complex web. If application activity exceeds a threshold level, the tool may deploy contingency measures. Such contingency measures may include aborting patch installation and reconnecting the target systems to the complex web. Contingency measures may include aborting or postponing scheduled maintenance windows associated with other computer systems.

At step 6, the tool connects the target system to the patch sever. While connected to the patch server, the target system may obtain patches for applications and/or hardware running on the target system. In some embodiments, the patch server may initiate an installation process of the patches on the target system.

At step 7, after patches have been installed on the target system, the target system is reconnected to the complex web.

Figure 7:
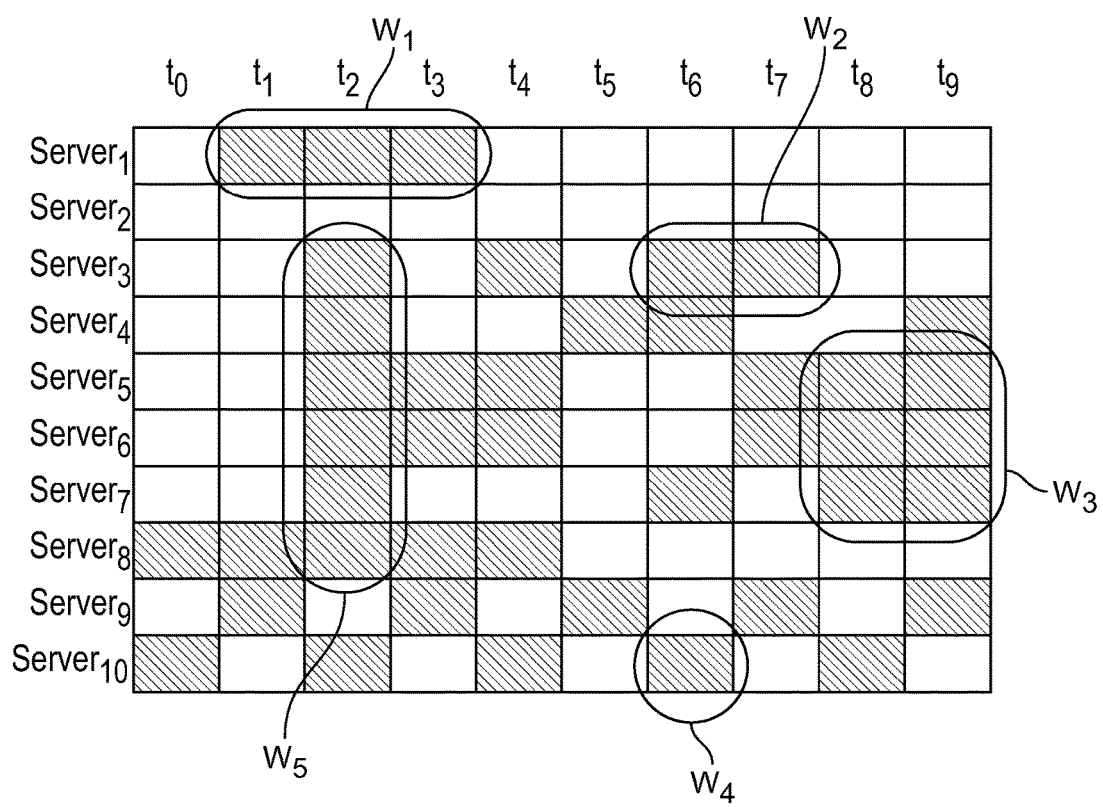
FIG. 7 shows illustrative information in accordance with principles of the invention.

FIG. 7 shows an illustrative matrix of light and dark pods for a target group of ten severs. Each light pod (non-shaded box) may correspond to a time-period during which a member of the target group is running a greater number of applications than during each dark pod (shaded box).

For example, FIG. 7 shows that server$_1$ may be taken offline (e.g., disconnected from a complex web) during window$_1$ for a duration of t$_1$-t$_3$. FIG. 7 shows that server$_3$, server$_4$, server$_5$, server$_6$, server$_7$ and server$_8$ may all be taken offline together during window$_5$ for a duration of t$_2$. Server$_3$, server$_4$, server$_5$, server$_6$, server$_7$ and server$_8$ may collectively form a target group.

FIG. 7 shows that server$_3$ may be taken offline during window$_2$ for a duration of t$_6$-t$_7$. In some embodiments server$_3$ may also be taken offline together with server$_4$ and server$_5$ at t$_2$. For example, server$_3$ may run applications that are also run by server$_4$ and server$_5$. Server$_3$ may also independently run other applications that are not run by server$_4$ or server$_5$.

FIG. 7 shows that server$_5$, server$_6$ and server$_7$ may be taken offline during window$_3$ for a duration of t$_8$-t$_9$. In some embodiments, server$_5$, server$_6$ and server$_7$ may not be taken offline during window$_5$. Instead, only window$_3$ may be scheduled for server$_5$, server$_6$ and server$_7$, collectively. FIG. 7 shows that server$_{10}$ may be taken offline during window$_4$ for a duration of t$_6$.

Thus, methods and apparatus for a security enhancement tool for a target computer system operating within a complex web of interconnected systems have been provided. Persons skilled in the art will appreciate that the present invention can be practiced by other than the described embodiments, which are presented for purposes of illustration rather than of limitation. The present invention is limited only by the claims that follow.

What is claimed is:

1. An enterprise level tool for maintaining a quality of service provided by a complex web of computer systems when disconnecting one or more computer systems of the complex web, said complex web being a computer network comprising 200,000 or more interconnected computer systems, the tool comprising:

a non-transitory machine readable memory storing computer executable instructions; and a processor configured to execute the computer executable instructions, wherein the computer executable instructions, when executed by the processor:

monitor a computational load processed by the complex web, said computational load due at least in part to a number of applications running on each of the interconnected computer systems;

determine, during a pre-determined time period, a matrix of light and dark pods for each computer system within the complex web, wherein each light pod corresponds to a time-period during which each computer system is running a greater number of applications, and an associated higher level of computational load, than during each dark pod;

group a plurality of the computer systems based on each computer system in the group having a matrix of light and dark pods that is within a predetermined tolerance;

determine a time-sensitive window for the group comprising a subset of the light and dark pods for each computer system in the group, such that during the time-sensitive window each computer system in the group may be disconnected from the complex web without disrupting a computational load processed by the complex web during the time-sensitive window;

disconnect each computer system in the group from the complex web during the time-sensitive window; and during the time sensitive window and while each computer system is disconnected from the complex web:

measure an impact of the disconnecting on the computational load of the complex web, and incrementally reconnect each disconnected computer system when the impact lowers a computational load that may be processed by the complex web below a predetermined threshold;

update the group in response to incrementally reconnecting computer systems; and connect each computer system in the group to a remote server that corrects one or more cybersecurity flaws associated with software running on each disconnected computer system.

2. The enterprise level tool of claim 1 wherein the time-sensitive window comprises only dark pods.

3. The enterprise level tool of claim 1 wherein the time-sensitive window comprises a plurality of dark pods and at least one light pod.

4. The enterprise level tool of claim 1 wherein when the one or more cybersecurity flaws comprise a fatal flaw, the time-sensitive window comprises more light pods than dark pods.

5. The enterprise level tool of claim 1, wherein the complex web of interconnected computer systems comprises between 200,000 and 2,000,000 computer systems distributed over a plurality of time zones.

6. An enterprise level tool for disconnecting a target computer system from a complex web, said complex web being a computer network comprising 200,000 or more interconnected computer systems, the tool comprising:
a non-transitory machine readable memory storing computer executable instructions for implementing a first subroutine, a second subroutine, a third subroutine, and a correlation subroutine, wherein execution of the subroutines collectively disconnect the target system from the complex web and maintain operational stability of the complex web while the target system is disconnected; and
a processor configured to execute the computer executable instructions;
wherein:
the first subroutine monitors a computational load processed by the complex web, said computational load due at least in part to a number of applications running on each interconnected computer system, and determines, based on the computational load, a target level of operational readiness for the target computer system during a pre-determined timeframe;
the second subroutine determines computational resources required by the target computer system to achieve the target level of operational readiness during the pre-determined timeframe;
the third subroutine monitors for a plurality of events, wherein each event alters the target level of operational readiness during the pre-determined timeframe; and
the correlation subroutine:
determines, based on the target level of operational readiness and the determined computational resources, a time-sensitive window during which the target computer system is to be disconnected from the complex web without compromising operational readiness of any other computer system within the complex web;
reserves the time-sensitive window for the target computer system, thereby preventing any other of the interconnected computer systems from reserving the time-sensitive window;
at a start of the time-sensitive window, disconnects the target computer system from the complex web; and
during the time-sensitive window, installs a stack of software patches on the target computer system;
wherein execution of the first, second, third and correlation subroutines stabilizes the computational load processed by the complex web while the target computer system is disconnected from the complex web.

7. The enterprise level tool of claim 6, wherein a size of the time-sensitive window is determined based on a size of the stack of software patches that cure one or more security flaws of the target computer system.

8. The enterprise level tool of claim 6, wherein the time-sensitive window is a first time-sensitive window and the correlation subroutine:
receives a request to reschedule the first time-sensitive window;
in response to receiving the rescheduling request, determines if a second time-sensitive window is available within 90 days of an end of the first time-sensitive window; and
when the second time-sensitive window is available within 90 days of the first time-sensitive window, dynamically reschedules the first time-sensitive window and assigns the target computer system a second time-sensitive window such that the second time-sensitive window begins within 90 days of the end of the first time-sensitive window.

9. The enterprise level tool of claim 6, wherein the correlation subroutine reschedules the time-sensitive window a maximum of three times.

10. The enterprise level tool of claim 6 wherein, when the target computer system is disconnected from the complex web, the enterprise level tool connects the target computer system to a remote patch server that installs the stack of software patches on the target computer system after the target system is disconnected from the complex web.

11. The enterprise level tool of claim 6 wherein:
the third subroutine continuously monitors for each of the plurality of events up to a start of the time-sensitive window; and
in response to detecting at least one of the plurality of events, dynamically reschedules the time-sensitive window.

12. An enterprise level tool for taking a target computer system operating within a complex web offline and updating software running on the target computer system without disturbing an operational equilibrium of the complex web, said complex web being a computer network comprising 200,000 or more interconnected computer systems, the tool comprising:
a non-transitory machine readable memory storing computer executable instructions; and
a processor configured to execute the computer executable instructions, wherein the computer executable instructions, when executed by the processor:
receive a plurality of rules that determine a target level of operational readiness for the target computer system, the plurality of rules comprising one or more of:
hours of operation of the target computer system;
a maximum percentage of computational capacity to be disconnected while an application associated with the target computer system is running;
computer systems that provide redundancy for a shared application and are to be disconnected separately from the target computer system; and
computer systems that, to reduce downtime of the target computer system, are to be disconnected together with the target computer system;
monitor a computational load processed by the complex web, said computational load due at least in part to a number of applications running on each computer system;
monitor for a plurality of events that trigger an increase in the target level of operational readiness associated with the target computer system;
determine, based on the rules, the computational load, and the plurality of events, an expected computational demand, by other interconnected computer systems within the complex web, for operational resources of the target computer system;

determine, based on the expected demand, an expected computational capacity of the target computer system to service the expected computational demand;

determine a time-sensitive window during which the target computer system is to be taken offline thereby suspending access to the operational resources of the target computer system without compromising operational integrity of the other interconnected computer systems within the complex web;

reserve the time-sensitive window for the target computer system, thereby preventing any other computer systems from attaching to the time-sensitive window; and at a start of the time-sensitive window, take the target computer system offline;

wherein, the computer executable instructions maintain the operational equilibrium of the complex web during the time-sensitive window while the target computer system is offline.

13. The enterprise level tool of claim 12 further comprising a patch sub-system, the patch sub-system configured to obtain one or more software patches required by each interconnected computer system within the complex web, and when the target computer system is offline, pushing a stack of software patches to the target computer system.

14. The enterprise level tool of claim 13, the patch sub-system is further configured to:

before the target computer system is taken offline, identify one or more software applications running on the target computer system;

activate an application program interface ("API") that:
connects to a remote server storing a first software patch that cures a first security flaw in the one or more software applications running on the target computer;
obtains a copy of the first software patch;
when the stack of software patches associated with the target system exceed a pre-determined threshold, pushes the stack to the target computer system during the time-sensitive window; and
installs the stack of software patches on the target system.

15. The enterprise level tool of claim 14 further comprising computer executable instructions that when executed by the processor determine a size of the time-sensitive window based on time and computational resources needed to install the stack of software patches on the target computer system during the time-sensitive window.

16. The enterprise level tool of claim 12 further comprising computer executable instructions that when executed by the processor, dynamically reschedule the time-sensitive window in response to detecting at least one of the plurality of events that increases the target level of operational readiness for the target computer system.

17. The enterprise level tool of claim 12, wherein the complex web of interconnected computer systems comprises between 200,000 and 2,000,000 computer systems.

18. The enterprise level software tool of claim 12 further comprising computer executable instructions that when executed by the processor:
in response to scheduling the time-sensitive window, receive an override command to postpone the time-sensitive window; and
in response to receiving the override command, dynamically reschedule the time-sensitive window.

19. The enterprise level software tool of claim 18 further comprising computer executable instructions that when executed by the processor limit a number of times the time-sensitive window is rescheduled in response to the override command.

20. The enterprise level software tool of claim 12, wherein the complex web of computer systems is distributed over a plurality of time zones, and the time-sensitive window is determined based on a geographic location of the target computer system.

* * * * *